Feb. 20, 1923.
J. J. NOONAN.
INSECT TRAP.
FILED JULY 10, 1922.
1,445,906.
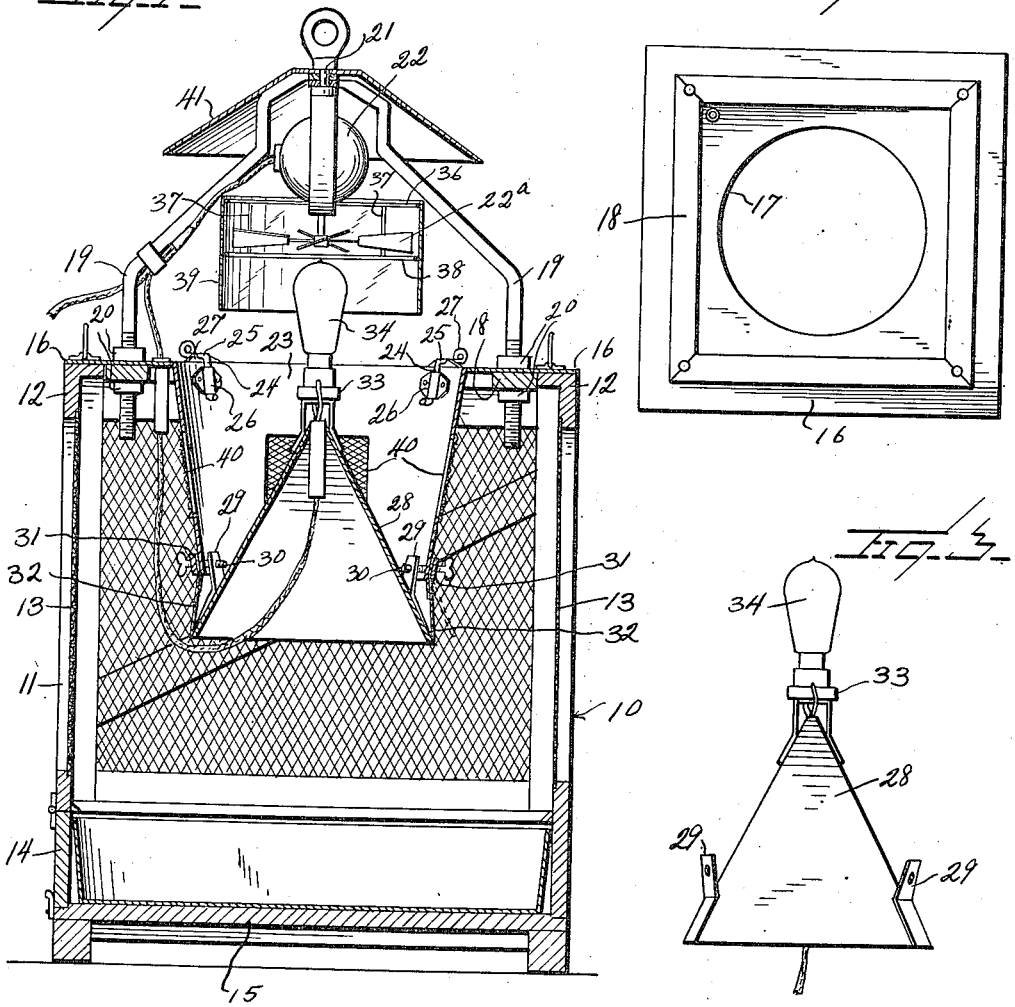
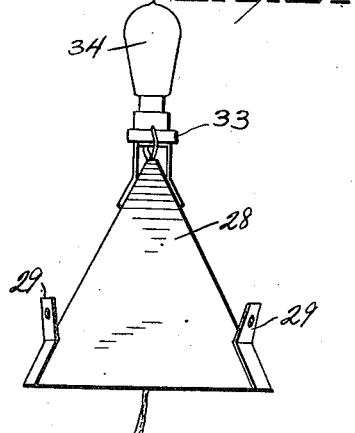
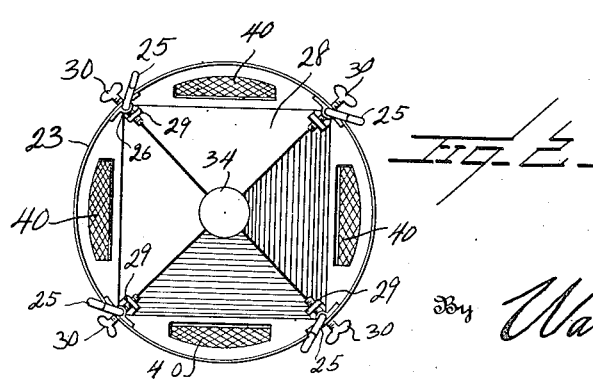
Inventor
J. J. Noonan
By Watson E. Coleman
Attorney Patented Feb. 20, 1923.

1,445,906

UNITED STATES PATENT OFFICE.

JOHN JAMES NOONAN, OF OBION, TENNESSEE.

INSECT TRAP.

Application filed July 10, 1922. Serial No. 573,866.

*To all whom it may concern:*

Be it known that I, JOHN JAMES NOONAN, a citizen of the United States, residing at Obion, in the county of Obion and State of Tennessee, have invented certain new and useful Improvements in Insect Traps, of which the following is a specification, reference being had to the accompanying drawings.

This invention relates to traps for insects, and particularly to that class of traps in which the insects are attracted to a point in front of a receptacle duct and then blown into said duct by a blast of air.

The general object of the invention is to provide a very simple and effective trap of this character which includes a supporting stand having a cage and duct leading into the interior of the cage, a light disposed at the entrance to the duct, and a fan so arranged that when an insect flies to the electric light the fan will blow the insect into the duct and through the duct into the receptacle supported on the frame.

A further object of the present invention is to so construct this trap that all the parts may be disassembled or as readily assembled.

A still further object is to provide a trap of this character which is extremely attractive to all insects.

Another object is to provide a trap of this character in which the fan and the hood thereof may be adjusted nearer to or further from the duct, and in which the fan is partially encased so as to prevent insects flying directly into the fan and being blown away from the light by the currents of air forced outward by the fan blades.

Other objects have to do with the details of construction and arrangement of parts as will be hereinafter more particularly described.

My invention is illustrated in the accompanying drawings, wherein:—

Figure 1 is a vertical sectional view of an insect trap constructed in accordance with my invention;

Figure 2 is a top plan view of the passageway 23 and the pyramidal deflector 28;

Figure 3 is a side view of the deflector;

Figure 4 is an inside view of plate 16;

Referring to the drawings, 10 designates generally a cage shown as square and constructed of horizontal and vertical beams 11. These beams may be suitably framed into each other and braced from each other.

The members 12 describe a square. This frame of the cage is covered with wire gauze 13 and one wall of the cage below the wire guaze is provided with a door 14 whereby the insects collected in the cage may be readily removed. The cage has a bottom 15 and is supported on legs or in any other suitable manner.

Supported upon the top of the cage and resting upon the framing members 12 is a metallic plate 16 which is preferably, though not necessarily, enameled white upon its outer face. This plate may be enameled any other color which is attractive to insects. The center of this plate is cut out to provide an opening 17, and attached to the under face of the plate is a square frame 18 which is adapted to fit within the beams 12 and hold the plate firmly yet detachably in position upon the top of the cage.

Passing upward through the plate adjacent the four corners thereof are the supporting rods 19. The lower ends of these rods extend vertically downward and are screw-threaded and pass through apertures and carry upper and lower nuts 20 whereby these rods 19 may be adjusted vertically. The rods 19 converge upward and intersect at the top, and passing through this intersection is a bolt 21 or other supporting member which supports an electric motor 22. To the shaft of this electric motor are attached the fan blades 22ª. Disposed within the central opening 17 of the plate 16 is a hollow, approximately cylindrical member 23 constituting a passageway. This is open at its upper and lower ends and is supported at its upper end by means of supporting rods 24 which are angularly bent, as at 25, and are rotatably mounted in sleeves 26 attached to the inner face of the wall of the passageway. The arms 26 engage within the keepers 27 mounted upon the plate 16. By this means the member 23 may be supported upon the plate 16 and depends below the plate into the cage 10.

Supported at the lower end of the hollow member 23 is an upwardly tapering or pyramidal light support and deflector 28 whose upper surface is preferably enameled white. Adjacent the lower corners of this pyramidal member there are attached the upwardly extending supports 29 which are adapted to be engaged by set screws 30 with the lower end of the member 23 and particularly with the reinforcement 31 which is riveted to the lower end of the member 23. These supports 29 support the pyramid 28 in such position that a space is left between the lower edge of the member 23 and the face of the pyramid, down which space insects are forced by the fan 23 into the cage. Doors 32 of celluloid or other light material are hinged to the lower edge of the member 23 and rest lightly against the lower end of the pyramid 28, but when a blast of air is forced downward through the passageway 23 past the cone 28 and out from the spaces between the pyramid and the member 23, these doors are forced open. The instant the blast of air ceases, however, the door will close. This prevents insects after having been forced into the cage from returning into the passageway 23 in case the blast from the fan should be stopped.

The upper end of the pyramid 28 carries the usual electric light base or socket 33 within which is mounted the ordinary incandescent lamp 34. Preferably the plate 16 is provided with handles whereby it may be manipulated and lifted off of the cage if desired.

Attached to the rods 19 on a line with the lower end of the motor and above the plane of revolution of the fans is a ring 36 having depending rods 37 supporting a second ring 38, and attached to these rings 37 and 38 and supported therefrom in depending spaced relation around the fan 23 and around the upper portion of the electric light bulb 34 is a shield 39 of thin transparent celluloid or like material. This acts to direct the air through the fan 22ª downward around the bulb into the passageway 23 and so downward around the deflecting pyramid 28. It will be noted that the passageway 23 is circular at its upper portion and approximately square at its lower portion so as to fit the base of the pyramidal member 28. Obviously the pyramidal member 28 might be made in the form of a cone, but in these circumstances it would be difficult to arrange the doors 32. Hence the deflector 28 is made pyramidal in form and the lower end of the passage 23 is made square instead of circular. Preferably the wall of the passageway 23 is provided at a plurality of points with windows 40 of fine wire gauze.

Disposed above the motor 22 and supported upon the upper portions of the rods 19 is a hood 41 which is also of white enameled sheet metal and protects the motor from moisture and acts to prevent the insects from flying directly inward toward the fan and being blown laterally outward. This hood 41 causes the insects, in order to approach the light, to move downward to a position below the fan and then inward toward the light. The braces 19 are adjustable up or down in order to suit different sized bulbs 34. The purpose of providing the screen windows 40 in the passageway 23 is to permit excess air to pass out through these screens and thus prevent any rebound of the air which would tend to carry the insects up again.

The operation of this device will be obvious from what has gone before. Insects will be attracted by the light and will fly toward it. In doing so they will come in the path of the wind current ejected by the fan 22ª and will be forced downward into the passageway 23 and out into the cage 10. The cage preferably contains a pan of water, oil or other suitable liquid, as for instance poisoning liquid, and the insects will be forced or drop into this liquid and be killed. Of course, the cage may be simply used for collecting the insects if desired. The cage may be cleaned out by means of the door in front.

While I have illustrated a particular form of my trap which I have found to be thoroughly effective for the purpose intended, I do not wish to be limited to this, as it is obvious that many changes might be made in the details of construction and arrangement of parts without departing from the spirit of the invention. While I have shown an upwardly tapering member 28 and prefer that this upwardly tapering member should be in the form of a pyramid, I do not wish to be limited to a pyramidal form, as any other upwardly tapering form may be used.

I claim:—

1. The combination with a cage and a passageway leading thereinto, of an electric fan disposed in alignment with the passageway and discharging thereinto, a light disposed at the entrance to the passageway, a member partially closing the inner end of the passageway but defining openings from the passageway into the cage, and swinging doors normally closing said openings.

2. The combination with a cage and a passageway leading thereinto, of an electric fan disposed in alignment with the passageway and discharging thereinto, a light disposed at the entrance to the passageway, a member partially closing the inner end of the passageway but defining openings from the passageway into the cage, and swinging doors normally closing said openings, said member supporting the light.

3. An insect trap of the character described comprising a cage, a passageway extending into the cage and open at its opposite ends, an upwardly tapering member partially closing the inner end of the passageway but having portions spaced from the lower edge of the pasageway to form apertures for the passage of insects, doors adapted to close said openings, a rotatable fan discharging into said passageway and against the apex of the upwardly tapering number, and an electric light carried upon the upwardly tapering member and projecting beyond the entrance to the passageway and disposed between the entrance to the passageway and said fan.

4. An insect trap of the character described comprising a cage, a passageway extending into the cage and open at its opposite ends, a upwardly tapering member partially closing the inner end of the passageway but having portions spaced from the lower edge of the passageway to form apertures for the passage of insects, doors adapted to close said openings, a rotatable fan discharging into said passageway and against the apex of the upwardly tapering member, an electric light carried upon the upwardly tapering member and projecting beyond the entrance to the passageway and disposed between the entrance to the passageway and said fan, a hood supported beyond the fan, and a transparent housing surrounding the fan and extending toward the electric light.

5. An insect trap comprising a cage forming the body of the trap, a hollow member open at both ends and constituting a passageway and depending into the cage from the top thereof, a upwardly tapering deflector mounted upon the lower end of the member and extending upward thereinto, the deflector being spaced at a number of points from the lower end of the hollow member to provide passageways, doors carried by the hollow member and adapted to close said passageways, said doors swinging outward, an electric light carried upon the upper end of the deflector and extending above said hollow member and the upper portion of the cage, supporting rods, an electric motor, a fan supported by the upper ends of said rods in alignment with the axis of the hollow member, the fan discharging toward the mouth of the hollow member, a shield of transparent material disposed around said fan, and a hood mounted upon said supports above the motor.

6. An insect trap of the character described comprising a cage, a plate forming the top of the cage and loosely supported thereon and having a central aperture, a tubular member extending downward from said aperture and detachably engaged with the plate, a upwardly tapering deflector carried by the lower end of the tubular member and extending upward thereinto, the tubular member at its lower edge being spaced at certain points from the base of the deflector, outwardly swinging doors mounted upon the tubular member and adapted to swing down against the base of the deflector, a lamp carried upon the apex of the deflector and projecting above the level of said plate, supporting rods mounted on the plate, a motor carried by the supporting rods, a downwardly discharging fan carried and operated by the motor and disposed above the lamp, a transparent shield surrounding the fan, and a downwardly flaring hood mounted upon said supporting rods above the motor and the fan.

In testimony whereof I hereunto affix my signature.

JOHN JAMES NOONAN.